United States Patent [19]

Bert

[11] Patent Number: 4,701,741

[45] Date of Patent: Oct. 20, 1987

[54] TEMPERATURE SENSING SYSTEM FOR AUTOMATIC TRANSMISSIONS

[76] Inventor: Wesley J. Bert, 3919 Dearborn Ave., Sarasota, Fla. 33581

[21] Appl. No.: 696,921

[22] Filed: Jan. 31, 1985

[51] Int. Cl.[4] ........................ B60Q 1/00; H01R 13/00; G08B 17/06

[52] U.S. Cl. ........................................ 340/57; 340/594; 340/693; 439/482

[58] Field of Search .................. 340/57, 594, 586, 596, 340/52 R, 79, 80, 90, 693, 815.03, 815.14, 815.18, 622; 339/182 R, 183, 108 TP; 374/188, 205, 208, 144, 147–148; 73/295

[56] References Cited

U.S. PATENT DOCUMENTS

| | | | |
|---|---|---|---|
| 2,236,435 | 3/1941 | Lockshin | 339/182 R |
| 2,453,606 | 11/1948 | Ward et al. | 339/182 R |
| 3,171,934 | 3/1965 | Brennan et al. | 340/594 |
| 3,295,120 | 12/1966 | Witchie | 340/594 |
| 3,309,598 | 3/1967 | Montgomery et al. | 339/182 R |
| 3,691,523 | 9/1972 | Helms et al. | 340/57 |
| 3,865,463 | 2/1975 | Busch | 339/108 TP |
| 4,498,726 | 2/1985 | Mattis | 339/182 R |
| 4,596,141 | 6/1986 | Kondo | 73/295 |

OTHER PUBLICATIONS

*Elektor*, vol. 6, No. 4, Apr., 1980, pp. 16–17, "A Dip-Stick Probe".

*Primary Examiner*—James L. Rowland
*Assistant Examiner*—Thomas J. Mullen, Jr.
*Attorney, Agent, or Firm*—Charles J. Prescott; Raymond H. Quist

[57] ABSTRACT

A console having annunciator lights and a cigar lighter receptacle compatible telescoping plug is mounted in the cigar lighter receptacle of an automobile. The plug is inserted in the receptacle using the console as a handle and telescopes within the console until the console abuts the dash board. Temperature sensing switch elements contained in an encapsulating capsule are connected by conductors to the lights and the receptacle power connections. The capsule is inserted in the transmission dip stick tube and the conductors pass through an existing opening in the fire wall.

4 Claims, 6 Drawing Figures

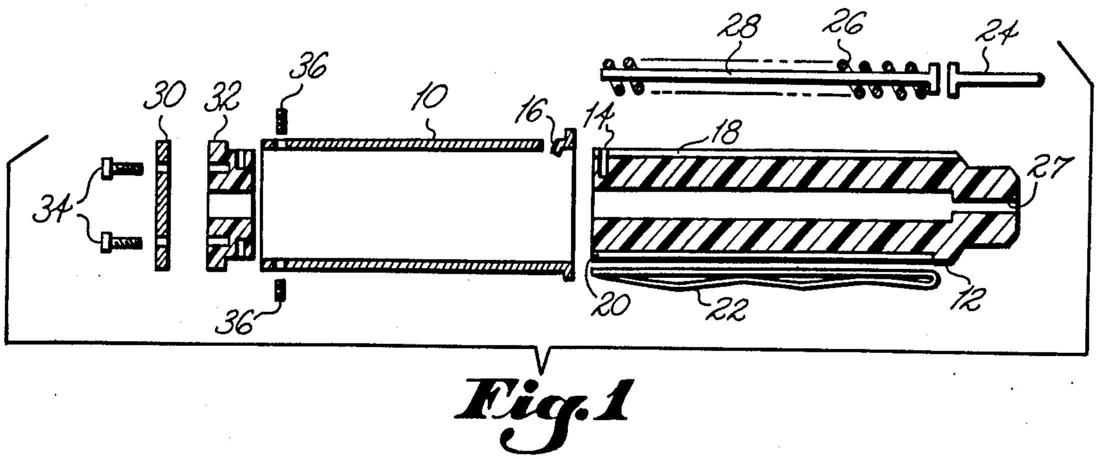
Fig. 1
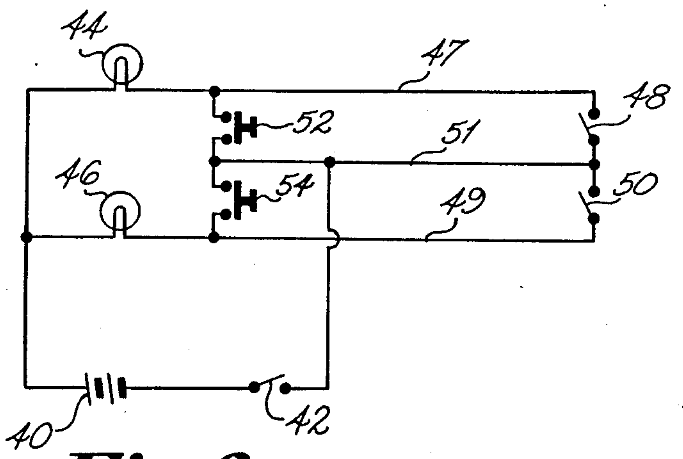
Fig. 2
Fig. 3
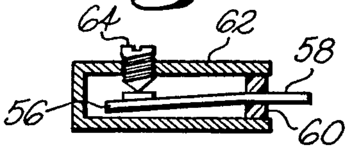
Fig. 4
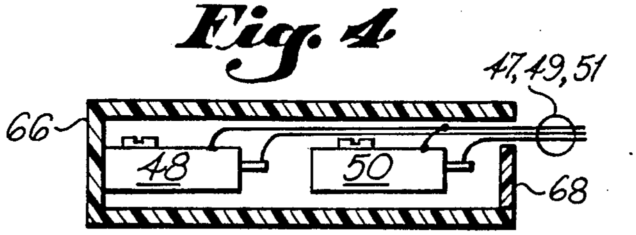
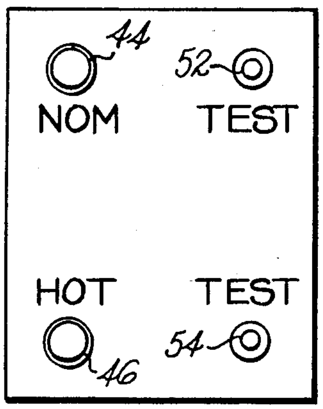
Fig. 6
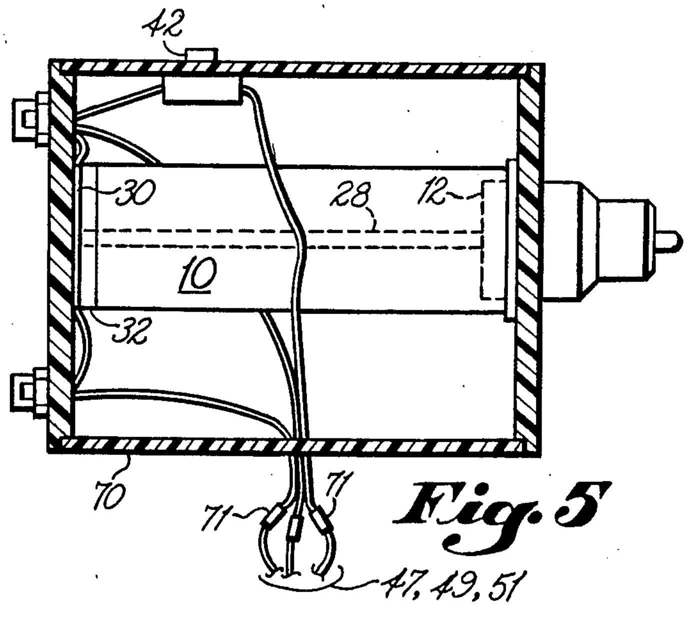
Fig. 5

TEMPERATURE SENSING SYSTEM FOR AUTOMATIC TRANSMISSIONS

BACKGROUND OF THE INVENTION

This invention relates generally to a detection and annunciator system for overheated automatic transmissions, and more particularly to such a detection and annunciator system which can be easily installed.

The automatic transmission used in many automobiles will generally function without problems under normal operating conditions when it is new, properly adjusted and has the proper level of transmission fluid which has not deteriorated. When the automobile is used to tow a trailer or given other hard use, or when any of the foregoing ideal conditions no longer exist, the transmission may overheat. If the overheating condition is not detected and the cause corrected, damage or destruction of the transmission can result.

Some newer and more expensive cars have a detection and annunciator system for overheated automatic transmissions installed by the automobile manufacturer; however, most automobiles do not have this type of system. Also, there have been available systems of this type with which an automobile may be retrofitted; however, these systems have required mechanical skills for installation which inhibit their use by many people.

SUMMARY OF THE INVENTION

A thermostatic element, adjusted to close an electric switch when automatic transmission fluid reaches an excessive temperature, is placed in a sealed capsule and provided with connecting wires long enough to permit it to be placed in the automatic transmission oil reservoir through the dip stick tube. The wires are extended to pass through any convenient existing opening in the firewall. Such openings normally have a rubber gasket which permits this to be readily accomplished. The wires are brought to a console which has an annuciator light and a telescoping plug permitting it to be mechanically and electrically connected to the cigar lighter. A second thermostatic element and associated light may also be provided to indicate normal operating temperature. A test switch may be provided for each light to assure proper functioning. A disabling switch may also be provided for use when it is not desired to have the system operate, such as when the engine is turned off.

BRIEF DESCRIPTION OF THE DRAWINGS

FIG. 1 is a cross-section of the telescoping plug of this invention;

FIG. 2 is an electrical schematic of the system of this invention;

FIG. 3 is a cross-section of a bimetal switch used in this invention;

FIG. 4 shows two bimetal switches in a capsule;

FIG. 5 is a side view of the console of this invention; and

FIG. 6 shows the appearance of the front cover of the console of FIG. 5.

DETAILED DESCRIPTION OF THE INVENTION

Referring to FIG. 1, the telescoping plug of the invention will first be described. Metal sleeve 10 is provided to receive electrical insulating plug 12. Plug 12 is inserted in sleeve 10 (at the left end of sleeve 10 in FIG. 1) and can be moved through sleeve 10 until pin 14, which is securely mounted in plug 12 engages stop 16 in sleeve 10. Axially extending groove 18 in plug 12 provides a restricted path for stop 16 and permits the engagement of pin 14 and stop 16 within the interior of sleeve 10. A second axially extending groove 20 does not continue completely across to the right end of plug 12. Groove 20 receives metal spring ribbon 22 which serves to hold plug 12 snugly within the cigar lighter receptacle. Because a portion of spring ribbon 22 also makes an electrical connection with sleeve 10, the end of spring ribbon 22 provides a convenient negative electrical terminal. Metal plunger 24, together with spring 26 and metal rod 28 are carried in passage 27 through plug 12 to provide a positive electrical connection between the positive terminal within the cigar lighter and metal plate 30. Metal plate 30 is secured to sleeve 10, but insulated therefrom by spacer 32. Screws 34 secure metal plate 30 to spacer 32, and screws 36 secure spacer 32 in sleeve 10.

Turning next to FIG. 2, battery 40 is symbolic of the electrical aspects of the plug of FIG. 1 which provides the necessary electric power for the system of this invention. Switch 42 is closed when it is desired to have the system operate and is opened to disable the system. The positive terminal is connected to lights 44 and 46 which serve as annunciators. Light 44 is further connected to bimetal operated switch 48 by conductor 47, and light 46 is further connected to bimetal operated switch 50 by conductor 49. Conductor 51 provides a return connected from switches 48 and 50 to the negative terminal of battery 40. Test switch 52 is connected between conductors 47 and 51 so that it may temporarily close the circuit between battery 40 and light 44, and test switch 54 is provided between conductors 49 and 51 to temporarily close the circuit between battery 40 and light 46.

Bimetal operated switches 48 and 50 are of the type illustrated in FIG. 3. Bimetal element 56 is connected to terminal 58 with insulator 60 providing a separation from metal housing 62. Screw 64 permits changing the temperature at which bimetal element 56 will make the electrical connection. In this case, bimetal element of 48 of FIG. 2 which, when closed, causes light 44 to be on, is set to close at 38 degrees C. (100 degrees F.) to indicate that normal operating temperature has been reached. Bimetal element 50, on the other hand, is set to close at 93 degrees C. (200 degrees F.) to indicate normal operating temperature has been exceeded or an overheated condition. The adjustable nature of bimetal operated switches 48 and 50 permits other temperatures to be used when desired. Bimetal operated switches of the type which have been used herein are commercially available from Chatham Controls Corporation of Chatham, N.J.

FIG. 4 shows bimetal switches 48 and 50 enclosed in capsule 66 with closure 68 to provide a liquid tight housing. Conductors 47, 49 and 51 of FIG. 2 extend through closure 68. The thin conductors which are adequate to carry the small currents involved are available in insulated ribbons. In use, capsule 66 is pushed down the dip stick tube which leads to the automatic transmission fluid reservoir. A sleeve may be used at the dip stick tube opening to prevent abrasion of the wires by the dip stick cap when it is returned to position. The ribbon of wires is then led through the fire wall at an existing opening by pushing aside the rubber seal temporarily. The ribbon is then carried to the console which will next be described.

FIG. 5 shows console 70 with the console side removed. Metal sleeve 10, metal plate 30 and insulator 32 are depicted. In broken lines plug 12 is shown as it would appear when fully extended. Rod 28 still makes electrical contact with metal plate 30 and is supported by insulator 32 adjacent to metal plate 30. It should be recognized that the cigar lighter receptacle is positioned in different locations in different automobiles, even within the ashtray assembly. For this reason a plug of a single length is not desirable for if it is long enough to be properly inserted in the more remote receptacles, it will protrude too much with a receptacle which is directly on the automobile dashboard. Consequently, plug 12 is first pulled out to a fully extended position, and then pushed into the receptacle using console 70 as a handle. Console 70 will continue to move to the dashboard or other stop while plug 12 telescopes within sleeve 10 to the amount possible. Disabling switch 42 is shown mounted on top of console 70, although it may be located elsewhere. Conductors 47, 49 and 51 from the probe of FIG. 5 are connected to the conductors within console 70 using connectors 71.

In FIG. 6, which shows the front cover of console 70, lights 44 and 46 are shown, as are the operating buttons of test switches 52 and 54.

It is evident that no particular skill is needed to install the system of this invention and the console with its telescoping plug provides a neat as well as utilitarian appearance.

Although a temperature sensing system for automatic transmissions has been illustrated and described, it will be evident that changes and modifications can be made without departing from the spirit of the invention and the scope of the appended claims.

I claim:

1. A temperature sensing system for installation in an automobile without the need for modification of the automobile, the automobile having a source of electric power and an automatic transmission with a dip stick tube and associated dip stick which extends into the automatic transmission fluid reservoir, said system comprising:

temperature sensing means independent of the dip stick sized to permit insertion into the automatic transmission reservoir through the dip stick tube;

said temperature sensing means having a first temperature responsive switch set to close at a first preset temperature;

said temperature sensing means encased in a liquid tight housing;

first insulated conductor means connected to said temperature sensing means in said liquid tight housing for extending through the dip stick tube;

annunciator means for announcing in response to the closing of said first temperature responsive switch that the automatic transmission fluid has reached said first preset temperature;

said annunciator means including a console having a cigar lighter receptacle compatible plug means telescopically mounted therein for making a connection to the automobile source of electrical power; and second insulated conductor means for connecting said annunciator means to said cigar ligher receptacle compatible plug means and to said first insulated conductor means.

2. A temperature sensing system for installation in an automobile without the need for modification of the automobile, the automobile having a source of electric power and an automatic transmission with a dip stick tube and associated dip stick which extends into the automatic transmission fluid reservoir, said system comprising:

temperature sensing means independent of the dip stick and sized to permit insertion into the automatic transmission reservoir through the dip stick tube;

said temperature sensing means having a first temperature responsive switch set to close when the normal operating temperature has been reached, and a second temperature responsive switch set to close when the normal operating temperature has been exceeded;

said temperature sensing means encased in a liquid tight housing;

first insulated conductor means connected to said temperature sensing means in said liquid tight housing for extending through the dip stick tube; annunciator means for announcing the closing of said first and second temperature responsive switches;

a cigar lighter receptacle compatible plug means for making a connection to the automobile source of electrical power;

said annunciator means including a console in which said cigar lighter receptacle compatible plug means is telescopically mounted; and second insulated conductor means for connecting said annunciator means to said cigar lighter receptacle compatible plug means and to said first insulated conductor means.

3. A temperature sensing system for installation in an automobile in accordance with claim 2 wherein:

said console has mounted thereon first and second lights operatively connected respectively to said first and second temperature responsive switches so that each light will be lit when its respective switch is closed.

4. A temperature sensing system for installation in an automobile in accordance with claim 3 further including:

a test switch operatively associated with each of said first and second lights for completing a temporary electrical connecting between its respective light and said automobile source of electrical power.

* * * * *